3,303,153
POLYMERIZATION INHIBITING MIXTURE OF PHENOL AND CHLORINE COMPOUND

Werner L. Jablonski, Midland, and Charles E. Colby, Freeland, Mich., assignors to The Dow Chemical Company, Midland, Mich., a corporation of Delaware
No Drawing. Filed Sept. 18, 1963, Ser. No. 309,598
4 Claims. (Cl. 260—29.6)

This invention relates to improvements in the film-forming properties of latexes of polymers and copolymers. In particular, it relates to an improved process of extending the useful film-forming life of aqueous latexes of normally crystalline vinylidene chloride polymers and copolymers by effectively reducing polymerization during storage thereof.

This application is a continuation-in-part of copending application Serial No. 214,817, filed August 6, 1962, now abandoned.

Unsupported films prepared from normally crystalline vinylidene chloride polymers and copolymers have properties which make them very useful as packaging materials and for the preparation of thermoplastic articles such as films, foils, and tapes. For example, the films prepared from crystalline copolymers composed predominantly of vinylidene chloride show a high resistance to the transmission of moisture vapor. However, it is difficult to prepare such films by conventional extrusion methods, because of the extreme sensitivity of such copolymers to heat. The lack of solubility in the common volatile solvents precludes the usual solvent coating techniques. It is desirable, therefore, to cast such films from the aqueous latex-like dispersions resulting from the emulsion polymerization of the monomers.

It is known that during the emulsion polymerization of latexes of normally crystalline polymers and copolymers the conversion of monomers to polymer is commonly stopped short of 100 percent, prior to coagulation of such latex. If such latexes are permitted to polymerize to substantial completion prior to coagulation, the characteristics and properties of the final polymeric product may be changed, and the manufacture of continuous coherent articles having the desirable continuity of properties is often difficult to obtain.

It is further known that such aqueous latex-like dispersions as commonly prepared often undergo post-polymerization during storage prior to continuous localized coagulation of such latex with resultant deleterious effect on the coagulum.

It is accordingly, the primary object of this invention to provide a process for effectively reducing or eliminating polymerization of aqueous latexes of normally crystalline vinylidene chloride polymers and copolymers during storage thereof, thereby extending the useful film-forming life of such latexes.

The above and related objects are accomplished by a process consisting of (1) preparing an aqueous latex by emulsion polymerization of a monomeric mixture of vinylidene chloride and a polymerizable comonomer, and (2) terminating the polymerization between about 55 and 90 percent conversion of monomer to polymer by adding to the emulsion polymerizate between about 0.01 and 1, and preferably between about 0.06 and 0.07 weight percent based on the solids of the emulsion polymerizate of a polymerization inhibiting agent consisting essentially of a compound capable of releasing substantial amounts of chlorine dioxide in aqueous solution, preferably at least one compound selected from the group consisting of chlorine dioxide and alkali metal chlorites.

In a preferred embodiment of the present invention, the polymerization inhibiting agent is an admixture consisting of (a) at least 0.001 weight percent, and preferably 0.015 weight percent, of at least one compound selected from the group consisting of chlorine dioxide and alkali metal chlorites, and (b) at least about 0.02 weight percent, and preferably 0.1 weight percent, of at least one phenolic compound selected from the group consisting of phenol, paramethoxyphenol or hydroquinone, such admixture providing advantageous synergistic effects.

Although any polymer latex may be treated in accordance with this invention, it has been found that the process is particularly well adapted for use in preserving or extending the useful film-forming life of the normally crystalline vinylidene chloride latexes. Representative of such polymeric materials are the polymers of vinylidene chloride and copolymers and terpolymers consisting of at least about 70 percent, of vinylidene chloride with one or more monoethylenically unsaturated comonomers such as vinyl esters, including vinyl acetate and vinyl propionate, alkyl acrylates having from 1 to about 8 carbon atoms in the alkyl group, the alkyl methacrylates having from about 1 to about 8 carbon atoms in the alkyl group, and acrylonitrile.

The formation of aqueous dispersions, such as latexes, of polymeric materials is well-known in the art. Typically, the monomeric materials are introduced into an aqueous phase containing a water-soluble redox polymerization catalyst such as iron-hydrogen peroxide and a surface active agent capable of emulsifying the polymerizable substances. Examples of suitable emulsifiers are the soluble salts of long chain alkyl sulfates or sulfonates or the like. The polymerization is usually carried out by heating the aqueous emulsion of said mixture at temperatures between 10° C. and 70° C. with initial agitation. After polymerization is complete, the resulting latex is generally filtered to remove any precoagulum. Any useful normally crystalline vinylidene chloride latex may be employed for the purposes of the present invention.

Latexes of normally crystalline vinylidene chloride undergo only moderate post-polymerization with resultant increases in percent polymer solids during storage for the first few hours of its life at normal room temperatures and pressures. During this period, continuous, coherent films may be cast from the latex without the modification of this invention. However, when it is desired to store such latexes for extended periods, they gradually increase in polymer solids as a result of post-polymerization of residual monomeric materials. Generally, when the latexes have polymerized to essential completion, no useful film is obtained. When the latexes are treated according to the process of the present invention, the polymerization of the latex is noticeably reduced or eliminated and the useful life of the latex is thereby extended.

The polymerization inhibiting agents useful for the purposes of the present invention consist essentially of compounds which release substantial amounts of chlorine dioxide in aqueous solution. Representative of such compounds are the alkali metal chlorites, including sodium, potassium, and lithium chlorites. Also operable is chlorine dioxide gas itself. Because of its availability and ease of handling, sodium chlorite is preferred. It is necessary that the chlorine dioxide is readily available in adequate amounts. For this reason, compounds such as sodium perchlorate, sodium perborate and the like are less desirable.

The amount of chlorine dioxide releasing agent which is employed will vary with the specific polymeric material and with the specific chlorine dioxide releasing compounds, as well as the composition of the polymerization inhibiting agent used.

It has been found that when at least one of the chlorine dioxide releasing agents, as described herein, is used as the sole constituent of the polymerization inhibiting agent of the present invention, at least about 0.01 weight percent, and preferably between about 0.06 and 0.07 weight percent, based on the weight of polymer solids of the emulsion polymerizate is required.

It has further been found that advantageous synergistic effects are obtained and lesser amounts of such chlorine dioxide releasing agents, as described herein, are required if used in admixture with small amounts of at least one phenolic compound selected from the group consisting of phenol, para-methoxyphenol or hydroquinone. Specifically, the so-formed polymerization inhibiting agents advantageously consist of at least about 0.001 weight percent, and preferably 0.015 weight percent, of the chlorine dioxide releasing agents described herein, and at least about 0.02 weight percent, and preferably 0.1 weight percent, of the herein defined phenolic compounds.

Amounts of the polymerization inhibiting agents described herein in excess of about 1 weight percent based on the weight of polymer solids do not materially increase the advantageous results described herein and thus are unnecessary for the purposes of the present invention.

Aqueous solutions of the polymerization inhibiting agents described herein are easily incorporated into the latex by simple intermixing using conventional techniques. Alternatively, chlorine dioxide gas may be bubbled through the latex until a requisite or desired amount is present therein.

The latex compositions may contain the other usual additives, such as dyes, pigments, light stabilizers, heat stabilizers, and fillers, that, pursuant to conventional practice, are suitable for incorporation in the polymer formulation.

The following examples, wherein all parts and percentages are to be taken by weight, illustrate the present invention but are not to be construed as limiting its scope.

*Example 1*

In each of a series of experiments, a monomer composition of 96 percent vinylidene chloride and 4 percent ethyl acrylate was polymerized to about 70 percent conversion of monomers to polymer to form a latex having 33 percent polymer solids by conventional emulsion techniques. To individual two liter samples of each of these latexes was added 100 grams of a 10 percent solution of the dioctyl ester of sodium sulfosuccinic acid, and varying amounts of one of the polymerization inhibiting agents of the present invention. For purposes of comparison, a similar latex was prepared to which only phenol was added as a polymerization inhibiting agent.

Each of the so-formed latexes was allowed to stand for one week at about 25° C. and the percent latex polymer solids individually determined by conventional methods. The results of these measurements and the percent increase of latex polymer solids after aging, as well as the composition and amounts of polymerization inhibiting agents used are reported in the following Table I.

TABLE I

| Run No. | Polymerization Inhibiting Agent | | Percent Latex Polymer Solids | | Increase in Percent Latex Polymer Solids after Aging |
|---|---|---|---|---|---|
| | Kind | Percent Based on the Weight of Polymer Solids | Before Aging | After Aging | |
| For Comparison: 1 | Phenol | 0.11 | 30.6 | 34.7 | 4.1 |
| This Invention: | | | | | |
| 2 | NaClO$_2$ | 0.05 | 31.5 | 34.0 | 3.5 |
| 3 | NaClO$_2$ | 0.08 | 31.5 | 32.7 | 1.2 |
| 4 | NaClO$_2$ Plus Phenol | 0.018  0.11 | 30.7 | 31.3 | 0.6 |

*Example 2*

In each of a series of experiments, a monomer composition as described in Example 1 was polymerized to about 70 percent conversion of monomers to polymer to form a latex having 33 percent polymer solids by conventional emulsion techniques. To individual two liter samples of each of these latexes were added varying percentages of a polymerization inhibiting agent consisting of varying amounts of sodium chlorite plus 0.11 weight percent of phenol. For purposes of comparison, a similar latex was prepared to which was added a polymerization inhibiting agent consisting of 0.065 weight percent sodium perchlorate plus 0.11 weight percent of phenol.

Each of the so-formed latexes was allowed to stand for varying periods of time at normal room temperatures, and the percent solids of the latexes individually determined by conventional methods. The results of these measurements and the increase in latex solids after aging, as well as the composition and amounts of polymerization inhibiting agents are reported in the following Table II.

TABLE II

| Run No. | Polymerization Inhibiting Agent | | Percent Latex Polymer Solids After Aging for— | | | | | Increase in Percent Latex Polymer Solids After Aging for— | | | |
|---|---|---|---|---|---|---|---|---|---|---|---|
| | Kind | Percent Based on the Weight of Polymer Solids | 0 Hr. | 1 Hr. | 2 Hrs. | 6 Hrs. | 24 Hrs. | 1 Hr. | 2 Hrs. | 6 Hrs. | 24 Hrs. |
| For Comparison: 5 | NaClO$_4$ + Phenol | 0.065  0.11 | 33.8 | 36.5 | 38.5 | 40.8 | | 2.7 | 4.7 | 6.5 | |
| This Invention: | | | | | | | | | | | |
| 6 | NaClO$_2$ + Phenol | 0.014  0.11 | 34.7 | 34.8 | 34.8 | | 35.0 | 0.1 | 0.1 | | 0.3 |
| 7 | NaClO$_2$ + Phenol | 0.007  0.11 | 35.0 | | | 35.4 | 35.6 | | | 0.4 | 0.6 |

Example 3

In each of a series of experiments, a monomer composition of 91.5 percent vinylidene chloride and 8.5 percent acrylonitrile was polymerized to about 70 percent conversion of monomers to polymer to form a latex having a 22 to 30 percent polymer solids by conventional emulsion techniques. To each of these latexes were added varying amounts of one of the polymerization inhibiting agents of the present invention. For purposes of comparison, a latex was similarly prepared to which no polymerization inhibiting agent was added.

Each of the so-formed latexes was allowed to stand for varying periods of time at normal room temperatures, and the percent polymer solids individually determined by conventional methods. The results of these measurements and the percent increase of polymer solids after aging, as well as the composition and amounts of polymerization inhibiting agents used are reported in the following Table III.

TABLE III

| Run No. | Polymerization Inhibiting Agent | | Percent Latex Solids After Aging for— | | | | | Increase in Percent Latex Polymer Solids After Aging for— | | | |
|---|---|---|---|---|---|---|---|---|---|---|---|
| | Kind | Percent Based on the Weight of Polymer Solids | 0 Hr. | 6 Hrs. | 7 Hrs. | 1 Day | 3 Days | 6 Hrs. | 7 Hrs. | 1 Day | 3 Days |
| For Comparison: 8 | None | | 22.8 | 25.0 | | 25.0 | | 2.2 | | 2.2 | |
| This Invention: 9 | NaClO$_2$ | 0.05 | 22.0 | 21.9 | | 22.0 | | None | None | None | None |

The improvement of inhibition of formation of polymer solids is readily apparent from the results reported on Table I, Table II, and Table III. Reference to data presented in Table II also illustrates the advantageous results obtained using polymerization inhibiting agents containing sodium chlorite as compared to the corresponding sodium perchlorate. The advantageous synergism produced by the admixture of sodium chlorite and phenol are apparent by reference to Run Nos. 1 through 4 as reported on Table I. Additionally, equally good results were obtained by replacing phenol with equimolar amounts of para-methoxyphenol or hydroquinone.

Similar good results are obtained by the process of the present invention wherein the polymerization inhibiting agents described by the invention contain between about 0.01 and 1 weight percent based on the weight of latex polymer solids of a compound selected from the group consisting of chlorine dioxide and alkali metal chlorites; and alternatively, wherein the polymerization inhibiting agents described herein contain at least about 0.001 weight percent based on the weight of latex solids of a compound selected from the group consisting of chlorine dioxide and alkali metal chlorites admixed with at least about 0.02 weight percent of a phenolic compound selected from the group consisting of phenol, para-methoxyphenol and hydroquinone.

What is claimed is:

1. A process for extending the useful film-forming life of an emulsion polymerizate composed predominantly of a normally crystalline vinylidene chloride polymer which emulsion polymerizate normally is capable of depositing continuous, coherent films when fresh and loses that ability on aging, which comprises (1) preparing an aqueous latex by emulsion polymerization of a monomeric mixture of vinylidene chloride and a polymerizable comonomer, and (2) terminating the polymerization between about 55 and 90 percent conversion of monomer to polymer, by adding to the emulsion polymerizate less than about 1 weight percent based on the polymer solids of said emulsion polymerizate of a polymerization inhibiting agent consisting essentially of an admixture of (a) between about 0.001 and about 0.015 weight percent of at least one compound selected from the group consisting of chlorine dioxide and alkali metal chlorites, and (b) at least about 0.02 weight percent of at least one phenolic compound selected from the group consisting of phenol, para-methoxyphenol and hydroquinone.

2. The process of claim 1 wherein said normally crystalline vinylidene chloride polymer contains at least about 70 percent vinylidene chloride with the remainder being at least one other monoethylenically unsaturated comonomer that is polymerizable with vinylidene chloride.

3. The process of claim 2 wherein said monoethylenically unsaturated comonomer is ethyl acrylate.

4. The process of claim 2 wherein said monoethylenically unsaturated comonomer is acrylonitrile.

References Cited by the Examiner

UNITED STATES PATENTS 2,662,867 12/1953 Hoertz _____ 260—45.95
3,092,598 6/1963 Hanh et al. _____ 260—29.6

MURRAY TILLMAN, *Primary Examiner.*

J. ZIEGLER, *Assistant Examiner.*